(12) United States Patent
Zhou et al.

(10) Patent No.: US 11,140,462 B2
(45) Date of Patent: Oct. 5, 2021

(54) METHOD, APPARATUS, AND DEVICE FOR GENERATING AN ESSENCE VIDEO AND STORAGE MEDIUM

(71) Applicants: BAIDU ONLINE NETWORK TECHNOLOGY (BEIJING) CO., LTD., Beijing (CN); SHANGHAI XIAODU TECHNOLOGY CO. LTD., Shanghai (CN)

(72) Inventors: Yaqiong Zhou, Beijing (CN); Xi Zhang, Beijing (CN); Zhouwei Zhai, Beijing (CN); Xiangtao Jiang, Beijing (CN); Ben Xu, Beijing (CN); Fei Wang, Beijing (CN); Yue Liu, Beijing (CN); Zhaoji Xu, Beijing (CN); Wenlin Dong, Beijing (CN); Xinjie Wang, Beijing (CN)

(73) Assignees: BAIDU ONLINE NETWORK TECHNOLOGY (BEIJING) CO., LTD.; SHANGHAI XIAODU TECHNOLOGY CO. LTD.

( * ) Notice: Subject to any disclaimer, the term of this patent is extended or adjusted under 35 U.S.C. 154(b) by 0 days.

(21) Appl. No.: 16/517,876

(22) Filed: Jul. 22, 2019

(65) Prior Publication Data
US 2019/0349650 A1 Nov. 14, 2019

(30) Foreign Application Priority Data
Sep. 30, 2018 (CN) .......................... 201811161309.3

(51) Int. Cl.
*H04N 21/8405* (2011.01)
*H04N 21/472* (2011.01)
*H04N 21/845* (2011.01)

(52) U.S. Cl.
CPC ..... *H04N 21/8405* (2013.01); *H04N 21/47217* (2013.01); *H04N 21/8456* (2013.01)

(58) Field of Classification Search
None
See application file for complete search history.

(56) References Cited

U.S. PATENT DOCUMENTS

2014/0181668 A1\* 6/2014 Kritt ............... H04N 21/234318 715/719
2016/0014482 A1\* 1/2016 Chen ............... H04N 21/26258 386/241

(Continued)

FOREIGN PATENT DOCUMENTS

| CN | 104284216 A | 1/2015 |
|---|---|---|
| CN | 105611382 A | 5/2016 |

(Continued)

OTHER PUBLICATIONS

Office Action dated Jan. 2, 2020 in Corresponding Chinese Application No. 201811161309.3, 7 pages.

(Continued)

*Primary Examiner* — Omar S Parra
(74) *Attorney, Agent, or Firm* — Dilworth IP, LLC (57) ABSTRACT

The present disclosure provides a method, an apparatus, and a device for generating an essence video, and a storage medium. The method includes: acquiring a plot keyword in a plot introduction of a movie and a television play; acquiring a first plot fragment corresponding to the plot keyword according to the plot keyword; acquiring a second plot fragment with a heat meeting a preset condition, the second plot fragment being different from the first plot fragment; and generating an essence video according to the first plot fragment and the second plot fragment. The present disclosure can acquire an essence video which is stitched naturally, (Continued)

developed logically and includes a plot fragment with higher heat.

17 Claims, 6 Drawing Sheets

(56) References Cited

U.S. PATENT DOCUMENTS

| | | | |
|---|---|---|---|
| 2016/0142794 A1* | 5/2016 | Yoo | H04N 21/4394 |
| | | | 386/282 |
| 2016/0163860 A1 | 6/2016 | Lee | |
| 2017/0289619 A1* | 10/2017 | Xu | H04N 21/251 |

FOREIGN PATENT DOCUMENTS

| | | |
|---|---|---|
| CN | 105898362 A | 8/2016 |
| CN | 107454465 A | 12/2017 |
| CN | 107515870 A | 12/2017 |
| CN | 107801106 A | 3/2018 |
| JP | H1023362 A | 1/1998 |
| JP | 2007288300 A | 11/2007 |

OTHER PUBLICATIONS

Li, Xueshan et al., A Method of Assisting Movie Summarization based on Key Sentences of the Plot, The 30th Annual Conference of the Japanese Society for Artificial Intelligence, 2016, pp. 1-4.

First Office Action issued in JP Patent Application No. 2019130449 dated Sep. 23, 2020.

\* cited by examiner

METHOD, APPARATUS, AND DEVICE FOR GENERATING AN ESSENCE VIDEO AND STORAGE MEDIUM

CROSS-REFERENCE TO RELATED APPLICATIONS

This application claims priority to Chinese Patent Application No. 201811161309.3, filed on Sep. 30, 2018, which is hereby incorporated by reference in its entirety.

TECHNICAL FIELD

The present disclosure relates to the field of video technologies, and in particular, to a method, an apparatus, and a device for generating an essence video, and a storage medium.

BACKGROUND

In order to save a user's time to watch a movie/teleplay, a technique for playing a video at multi-times of speed and a technique for only watching a video fragment of a certain actor is currently proposed.

In the prior art, a video is played at multi-times of speed, for example, the video is played at double-times of speed, the video playing speed is doubled and the video content played is still a complete video content. For just watching a video fragment of a certain actor, it can play all the video fragments including the actor's shot, and does not play video fragments that do not include the actor's shot, and the video content played is part of the video content.

However, in the prior art, there is a problem that an essence video of the movie/teleplay cannot be acquired.

SUMMARY

The present disclosure provides a method, an apparatus, and a device for generating an essence video, and a storage medium, which are used to solve the problem that the essence video of the movie/teleplay cannot be acquired in the prior art.

In a first aspect, the present disclosure provides a method for generating an essence video, including:

acquiring a plot keyword in a plot introduction of a movie/teleplay;

acquiring a first plot fragment corresponding to the plot keyword according to the plot keyword;

acquiring a second plot fragment with a heat meeting a preset condition, the second plot fragment is different from the first plot fragment; and generating the essence video according to the first plot fragment and the second plot fragment.

Optionally, the acquiring the second plot fragment with the heat meeting preset condition includes:

determining an essence playing time according to a playing time of the movie/teleplay and a time factor of the movie/teleplay;

determining a heat playing time according to the essence playing time and a total playing time of all the first plot fragment; and acquiring the second plot fragment with the heat meeting the preset condition in a plurality of the third plot fragments according to the heat playing time, the plurality of the third plot fragments are plot fragments belonging to the movie/teleplay.

Optionally, the acquiring the second plot fragment with the heat meeting a preset condition in the plurality of the third plot fragments according to the heat playing time includes:

sorting the third plot fragments according to a heat, and obtaining the third plot fragments with the heat ranking from high to low; and screening the second plot fragment different from the first plot fragment in the third plot fragments in an order of heat from high to low until a total time of the second plot fragment reaches or exceeds the heat playing time.

Optionally, before the acquiring the second plot fragment with the heat meeting the preset condition in the plurality of the third plot fragments, it further includes:

acquiring third plot fragments according to a barrage volume of the movie/teleplay; and determining a heat of each of the third plot fragments according to a barrage volume of each of the third plot fragments.

Optionally, the generating the essence video according to the first plot fragment and the second plot fragment includes:

generating the essence video according to an initial playing time of the first plot fragment in the movie/teleplay and an initial playing time of the second plot fragment in the movie/teleplay.

Optionally, the method further includes:

receiving a playing request from a terminal device to the movie/teleplay, the playing request carries an identifier of the movie/teleplay; and sending a playing response to the terminal device, the playing response includes the essence video.

Optionally, the method further includes:

playing the essence video in response to a first playing indication from a user to the essence video of the movie/teleplay.

Optionally, the method further includes:

marking a playing position of the essence video in the movie/teleplay and a playing position of a non-essence video in the movie/teleplay during a playing process according to an identifier of the essence video and an identifier of the non-essence video respectively.

Optionally, the method further includes:

jumping to a target non-essence video according to the playing position of the target non-essence video in the movie/teleplay in response to a second playing indication from the user to the target non-essence video of the non-essence video; and continuously playing an essence video adjacent to the target non-essence video after the playing of the target non-essence video ends.

In a second aspect, the present disclosure provides an apparatus for generating an essence video, including:

a keyword acquiring module, configured to acquire a plot keyword in a plot introduction of a movie/teleplay;

a first fragment acquiring module, configured to acquire a first plot fragment corresponding to the plot keyword according to the plot keyword;

a second fragment acquiring module, configured to acquire a second plot fragment with a heat meeting a preset condition, the second plot fragment is different from the first plot fragment; and a generating module, configured to generate the essence video according to the first plot fragment and the second plot fragment.

Optionally, the second fragment acquiring module is specifically configured to:

determine an essence playing time according to a playing time of the movie/teleplay and a time factor of the movie/teleplay;

determine a heat playing time according to the essence playing time and a total playing time of all the first plot fragment; and acquire the second plot fragment with the heat meeting the preset condition in a plurality of third plot fragments according to the heat playing time, the plurality of third plot fragments are plot fragments belonging to the movie/teleplay.

Optionally, the second fragment acquiring module is configured to acquire the second plot fragment with the heat meeting the preset condition in the plurality of third plot fragments according to the heat playing time specifically includes:

sorting the third plot fragments according to a heat, and obtaining the third plot fragments with the heat ranking from high to low; and screening the second plot fragment different from the first plot fragment in the third plot fragments in an order of heat from high to low until a total time of the second plot fragment reaches or exceeds the heat playing time.

Optionally, the second fragment acquiring module is further configured to:

acquire the third plot fragments according to a barrage volume of the movie/teleplay; and determine a heat of each of the third plot fragments according to a barrage volume of each of the third plot fragments.

Optionally, the generating module is specifically configured to generate the essence video according to an initial playing time of the first plot fragment in the movie/teleplay and an initial playing time of the second plot fragment in the movie/teleplay.

Optionally, the apparatus further includes:

a receiving module, configured to receive a playing request from a terminal device to the movie/teleplay, the playing request carries an identifier of the movie/teleplay; and a sending module, configured to send a playing response to the terminal device, the playing response includes the essence video.

Optionally, the apparatus further includes:

a playing module, configured to play the essence video in response to a first playing indication from a user to the essence video of the movie/teleplay.

Optionally, the apparatus further includes:

a marking module, configured to mark a playing position of the essence video in the movie/teleplay and a playing position of a non-essence video in the movie/teleplay during a playing process according to an identifier of the essence video and an identifier of the non-essence video respectively.

Optionally, the device further includes a jumping module, configured to:

jump to a target non-essence video according to the playing position of the target non-essence video in the movie/teleplay in response to a second playing indication from the user to the target non-essence video of the non-essence video; and continuously play an essence video adjacent to the target non-essence video after the playing of the non-essence video ends.

In a third aspect, the present disclosure provides a device for generating an essence video, including:

a processor and a memory configured to store computer instructions; the processor running the computer instructions to perform the method according to any one of the above first aspect.

In a fourth aspect, the present disclosure provides a computer readable storage medium, wherein when instructions in the storage medium are executed by a processor of a device for generating an essence video, enabling the device for generating an essence video to perform the method according to any one of the above first aspect.

The method, the apparatus and the device for generating an essence video, and the storage medium provided in the present disclosure, by acquiring a first plot fragment corresponding to the plot keyword according to a plot keyword of a movie/teleplay; acquiring a second plot fragment with a heat meeting a preset condition, the second plot fragment is different from the first plot fragment; and generating the essence video according to the first plot fragment and the second plot fragment, acquires an essence video which is stitched naturally, developed logically and includes a plot fragment with higher heat.

BRIEF DESCRIPTION OF DRAWINGS

In order to illustrate the embodiments of the present disclosure or the technical solutions in the prior art clearer, the drawings used in the embodiments or the prior art description will be briefly described below. Apparently, the drawings described below are merely some embodiments of the present disclosure, and to persons skilled in the art, other drawings may be obtained according to these drawings without creative effort.

DESCRIPTION OF EMBODIMENTS

In order to make the objects, technical solutions and advantages of the embodiments of the present disclosure clearer, the technical solutions in the embodiments of the present disclosure are clearly and completely described in the following with reference to the accompanying drawings in the embodiments of the present disclosure. It is apparent that the described embodiments are a part of the embodiments of the disclosure, and not all of the embodiments. All other embodiments acquired by those skilled in the art based on the embodiments of the present disclosure without creative efforts are within the scope of the present disclosure.

Figure 1:
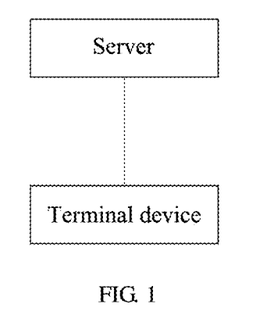
FIG. 1 is a schematic diagram of an application scenario of a method for generating an essence video according to an embodiment of the present disclosure.

FIG. 1 is a schematic diagram of an application scenario of a method for generating an essence video according to an embodiment of the present disclosure. As shown in FIG. 1, the application scenario may include a terminal device and a server, the terminal device is communicatively connected with the server, the terminal device can acquire a movie/teleplay from the server and play it. Where, the terminal device may be, for example, a smart device with a screen, such as a mobile phone, a tablet computer, and a smart loudspeaker with a screen.

Specifically, the essence video may be generated by the terminal device or the server. Further optionally, when the essence video is generated by the terminal device, the terminal device may acquire the movie/teleplay from the server, and the terminal device acquires the essence video of the movie/teleplay and plays the essence video. Further optionally, when the essence video is generated by the server, the server may acquire the essence video of the movie/teleplay, and send the essence video to the terminal device, which plays the essence video.

Where, the movie/teleplay may include: a movie, a teleplay, and the like.

Where, the essence video may refer to the most essential part of the movie/teleplay, and a time of the essence video is less than a time of the movie/teleplay.

At present, the movie/teleplay may have problems such as that the plot is long, and the story is dragged down and etc., which cause many users to fast forward when they watch, or simply give up watching. In the embodiment of the present disclosure, the problems such as that the plot is dragged down may be avoided by generating the essence video of the movie/teleplay, and the watching experience of the user may be improved.

Figure 2:
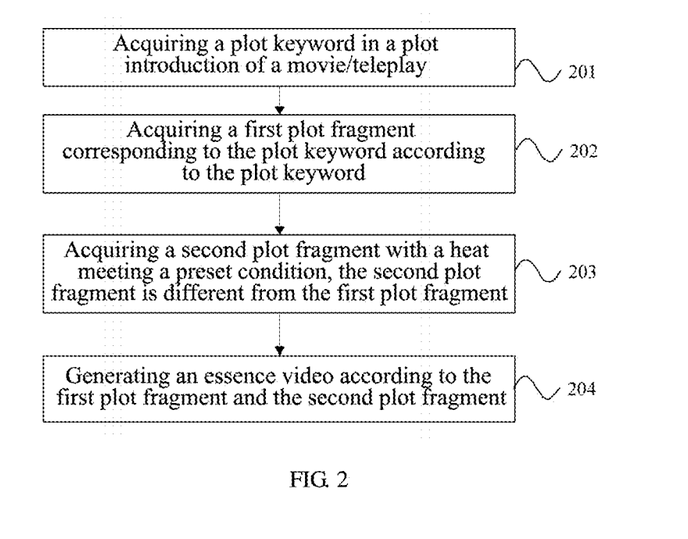
FIG. 2 is a schematic flowchart of a first embodiment of a method for generating an essence video according to an embodiment of the present disclosure.

FIG. 2 is a schematic flowchart of a first embodiment of a method for generating an essence video according to an embodiment of the present disclosure. The method provided in the present embodiment may be performed by the above-mentioned apparatus for generating the essence video, the apparatus for generating the essence video may specifically be a server or a terminal. As shown in FIG. 2, the method in the present embodiment may include:

Step 201, acquiring a plot keyword in a plot introduction of a movie/teleplay.

In this step, the plot introduction is used to introduce the plot concisely and briefly, and the plot introduction may usually tell the plot development completely and clearly, from the beginning to the end, with a detailed description. Where, the plot introduction of the movie may be used to introduce the plot of the movie concisely and briefly, and the plot introduction of the teleplay may be used to introduce the plot of each episode concisely and briefly.

Where, the plot keyword refers to a word that can reflect the plot of the movie/teleplay. Specifically, disassembled words may be acquired by disassembling the plot introduction of the movie/teleplay, and the plot keyword is determined from the disassembled words. Since a verb is a word used to state an action, a situation, and a change, it is possible to determine a plot keyword based on verbs. Optionally, the plot keyword may be a combination of such as a verb+a noun, or a noun+a verb+a noun.

Where, the number of the first plot fragment may be one or more, and a sum of a playing time of all the first plot fragments is equal to a total playing time of all the first plot fragments.

It should be noted that the specific manner of acquiring the plot introduction is not limited in the present disclosure.

Step 202, acquiring a first plot fragment corresponding to the plot keyword according to the plot keyword.

In this step, optionally, the movie/teleplay may be divided into multiple plot fragments, and each of the plot fragments in the multiple plot fragments may correspond to a fragment introduction. Further optionally, a fragment introduction matching the plot keyword may be determined according to the plot keyword and the relationship between different plot fragments and their fragment introductions, and a plot fragment corresponding to the fragment introduction matching the plot keyword is used as the first plot fragment corresponding to the plot keyword.

Optionally, when the movie/teleplay is a movie, the plot keyword may specifically be a plot keyword acquired according to a plot introduction of the movie, and different plot fragments may specifically be plot fragments obtained by dividing the movie. When the movie/teleplay is a teleplay, the plot keyword may specifically be a plot keyword acquired according to plot introductions of all episodes of the teleplay, and different plot fragments may specifically be plot fragments obtained by dividing all episodes of the teleplay.

It should be noted that the specific manner of dividing the movie/teleplay into a plurality of plot fragments and acquiring a fragment introduction corresponding to the plot fragment, is not limited in the disclosure.

Since the plot introduction may tell the plot development completely and clearly, from the beginning to the end, with a detailed description, the first plot fragment found according to the plot keyword of the plot introduction may make the essence video generated according to the first plot fragment stitched naturally and developed logically.

Step 203, acquiring a second plot fragment with a heat meeting a preset condition, the second plot fragment is different from the first plot fragment.

In this step, optionally, the movie/teleplay may be divided into multiple plot fragments, and each of the plot fragments in the multiple plot fragments may correspond to a heat. The heat may indicate the degree of interest of the user. The higher the heat of the plot fragment, the more the user is interested with the plot fragment. The lower the heat of the plot fragment, the less the user is interested with the plot fragment.

Where, the heat meeting the preset condition may indicate that the user is interested in reaching a certain level. Optionally, the preset condition may specifically indicate that a heat is higher than or equal to a preset heat; and/or may specifically indicate a preset number of plot fragments with the highest heat.

It should be noted that the specific manner of acquiring the heat of each plot fragment is not limited in the present disclosure.

Since the heat of the plot fragment may indicate the degree of interest of the user, by acquiring the second plot fragment with the heat meeting the preset condition, the essence video generated according to the second plot fragment may include a plot fragment with higher heat.

Step 204, generating the essence video according to the first plot fragment and the second plot fragment.

In this step, optionally, the essence video may be generated by stitching the first plot fragment and the second plot fragment, and the essence video may include the first plot fragment and the second plot fragment.

The method for generating the essence video provided by the present embodiment, by acquiring a first plot fragment corresponding to the plot keyword according to a plot keyword of a movie/teleplay; acquiring a second plot fragment with a heat meeting a preset condition, the second plot fragment is different from the first plot fragment; and generating the essence video according to the first plot fragment and the second plot fragment, acquires the essence video stitched naturally, developed logically and including a plot fragment with higher heat.

Figure 3A:
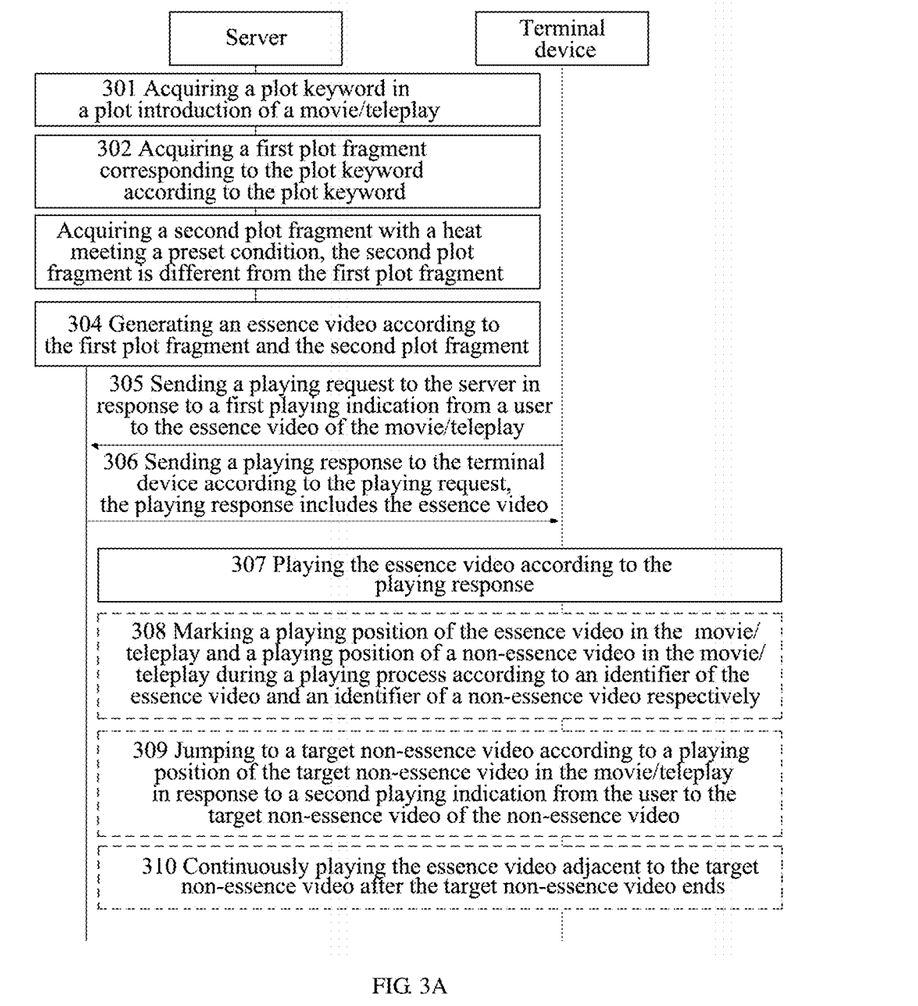
FIG. 3A is a schematic flowchart of a second embodiment of a method for generating an essence video according to an embodiment of the present disclosure.

FIG. 3A is a schematic flowchart of a second embodiment of a method for generating an essence video according to an embodiment of the present disclosure. The present embodiment mainly describes an optional implementation manner of generating an essence video by a server and playing the essence video by a terminal on the basis of the embodiment shown in FIG. 2. As shown in FIG. 3A, the method in the present embodiment may include:

Step 301, the server acquires a plot keyword in a plot introduction of a movie/teleplay.

It should be noted that Step 301 is similar to Step 201, and details are not described herein again.

Step 302, the server acquires a first plot fragment corresponding to the plot keyword according to the plot keyword.

It should be noted that Step 302 is similar to Step 202, and details are not described herein again.

Step 303, the server acquires a second plot fragment with a heat meeting a preset condition, the second plot fragment is different from the first plot fragment.

In this step, optionally, It can be based on the consideration of limiting the playing time of the desired essence video (that is, the essence playing time), the playing time of the second plot fragment (that is, the heat playing time) may be determined according to the essence playing time and the total playing time of all the first plot fragments.

Optionally, the essence playing time may be a preset time, or the essence playing time may be determined according to the playing time and the time factor of the movie/teleplay. Optionally, a value of the time factor may be less than 1, and a product of the playing time and the time factor of the movie/teleplay may be used as the essence playing time. For example, the playing time of the movie/teleplay may be recorded as n, the time factor may be 1/10, and the essence playing time may be equal to n/10. If there is a fractional part of n/10, it will only take an integer part thereof. For example, when n is equal to 1755 minutes (mins), the essence playing time n/10 may be about 176 mins.

Optionally, a value of the time factor may be greater than 1, and a result of dividing the playing time of the movie/teleplay by the time factor may be used as the essence playing time.

Optionally, the time factor may be set in advance, or may be set by a user or the like. Through that the time factor is set by the user, the time of the essence video may be set by the user, which improves the flexibility of the essence video.

Optionally, a result of subtracting the total playing time of the first plot fragment from the essence playing time may be taken as the heat playing time. For example, it is assumed that the playing time of the movie/teleplay is 2160 mins, the essence playing time is 2160/10=216 mins, and the total playing time of all the first plot fragment is equal to 120 mins, then the heat playing time may be 96 mins.

Further, after the heat playing time is determined, the second plot fragment with the heat meeting the preset condition in a plurality of third plot fragments is acquired according to the heat playing time, the plurality of third plot fragments are plot fragments belonging to the movie/teleplay. Where, the plurality of third plot fragments may define a range in which the second plot fragment is selected. Optionally, the plurality of third plot fragments may be all the plot fragments of the movie/teleplay; alternatively, the plurality of third plot fragments are part of the plot fragments other than the first plot fragment in the above-mentioned movie/teleplay; alternatively, the plurality of third plot fragments may be all the plot fragments of the movie/teleplay that can be acquired, and the all the plot fragments may specifically be all the plot fragments of the movie/teleplay, or may be part of the plot fragments of the movie/teleplay; alternatively, the plurality of third plot fragments may be plot fragments acquired according to a barrage volume of the movie/teleplay, for example, may be plot fragments with a barrage volume greater than a barrage volume threshold in all the plot fragments of the movie/teleplay that can be acquired.

Further optionally, when the plurality of third plot fragments do not include the first plot fragment, the acquiring the second plot fragment with the heat meeting the preset condition in the plurality of third plot fragments according to the heat playing time may specifically include:

sorting the plurality of third plot fragments according to a heat, and obtaining the third plot fragments with the heat ranking from high to low; and screening the second plot fragment in the plurality of third plot fragments in an order of heat from high to low until a total time of the second plot fragment reaches or exceeds the heat playing time.

Optionally, the heat of each the third plot fragment may be determined according to a barrage volume of each the third plot fragment in the plurality of third plot fragments. It should be noted that the specific manner of determining the heat of the third plot fragment according to the barrage volume of a third plot fragment is not limited in the present disclosure. For example, the barrage volume of the third plot fragment may be used as the heat of the third plot fragment. For another example, when the barrage volume of the third plot fragment is within a range, the heat corresponding to the range may be used as the heat of the third plot fragment.

Step 304, the server generates the essence video according to the first plot fragment and the second plot fragment.

In this step, since each plot fragment corresponds to an initial playing time and an end playing time, the initial playing time and the end playing time of the plot fragment may represent a sequence of playing between different plot fragments. Therefore, the step 304 may specifically include: generating the essence video according to the initial playing time of the first plot fragment in the movie/teleplay and the initial playing time of the second plot fragment in the movie/teleplay; or generating the essence video according to the end playing time of the first plot fragment in the movie/teleplay and the end playing time of the second plot fragment in the movie/teleplay.

Where, an initial playing time of a plot fragment may specifically be a playing time of a first frame image of the video fragment in the total playing time of the movie/teleplay; an end playing time of a plot fragment may specifically be a playing time of a last frame image of the video fragment in the total playing time of the movie/teleplay.

It should be noted that there may be a case in which the total playing time of all the first plot fragments may be greater than or equal to the essence playing time. When the total playing time of all the first plot fragments is equal to the essence playing time, the essence video may be generated according to the first plot fragments. When the total playing time of all the first plot fragments is greater than the essence playing time, the first plot fragment meeting a preset condition may be further selected from all the first plot fragments, and the essence video is generated according to the selected first plot fragment.

Step 305, the terminal device sends a playing request to the server in response to a first playing indication from a user to the essence video of the movie/teleplay.

In this step, the playing request may carry an identifier of the movie/teleplay, and may be used to request the essence video of the movie/teleplay. Optionally, the first playing instruction may be a voice command, a button command, or the like. The first playing indication may be, for example, a voice of "Open essence watching" input by the user, or the first playing indication may be, for example, a button "Open essence watching" clicked by the user.

Optionally, an entry for inputting the first playing instruction may be set on a current playing page of the movie/teleplay.

Figure 3B:
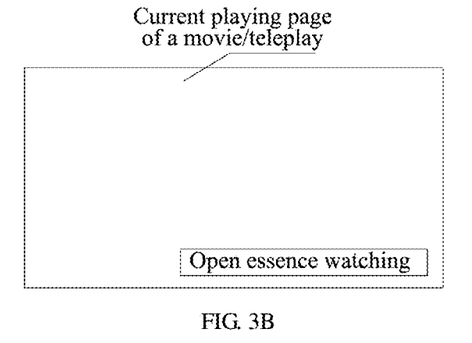
FIG. 3B-FIG. 3E are schematic diagrams of a current playing page of the second embodiment of the method for generating an essence video according to an embodiment of the present disclosure.

Optionally, as shown in FIG. 3B, a button of "Open essence watching" may be displayed to the user below the current playing page of the movie/teleplay. Here, the current playing page of the movie/teleplay may be used to play a complete movie/teleplay.

Further optionally, when the user may control the terminal device through the remote controller, if the remote controller focuses on the button of "Open essence watching" displayed on the terminal device, a prompt window displaying "only the essence fragment will be played" will appear above the button to explain a specific function of the button, and a prompt symbol "√" for the user to select may be provided under the button; when the remote controller focuses on the button of "Open essence watching" on a smart device with touch screen and the user presses the confirmation button (OK button) on the remote controller, it may indicate that the "Open essence watching" function is selected, and text and "√" in the prompt window may be both highlighted at the same time after the "Open essence watching" function is selected.

Optionally, in order to avoid disoperation, when the remote controller focuses on the button of "Open Essence Watching", it can be set that the remote controller may open the essence watching function only by pressing "OK button", and the "up", "down", "left" and "right" operations of the remote controller are invalid for the above prompt window. The other control elements such as the player may still be operated. After pressed, as long as leaving the button of "Open essence watching", the "Open essence watching" operation may be quitted and the prompt window disappears as well.

It should be noted that there is no order limitation between Step 305 and Steps 301-304.

Step 306, the server sends a playing response to the terminal device according to the playing request, the playing response includes the essence video.

In this step, optionally, the playing response further includes an identifier of the essence video and an identifier of the non-essence video. Where, the non-essence video may be other videos in the movie/teleplay other than the essence video. The identifier of the essence video may be used to indicate that the corresponding plot fragment is an essence video, the identifier of the non-essence video may be used to indicate that the corresponding plot fragment is a non-essence video.

It should be noted that the identifier of the essence video is different from the identifier of the non-essence video.

Step 307, the terminal device plays the essence video according to the playing response.

In this step, optionally, considering the user's watching experience, when the essence video is started to be played, the corresponding prompt window may not be displayed, and the corresponding voice broadcast is not performed.

Figure 3C:
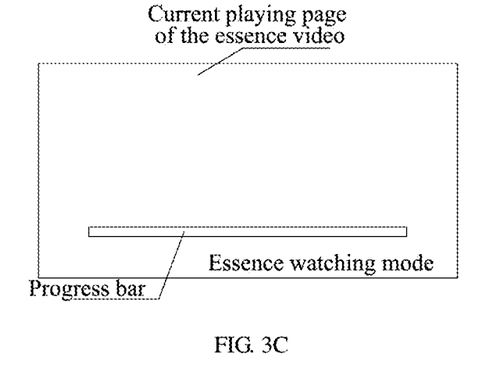

Optionally, in order to facilitate the user to know the current watching mode, after starting to play the essence video, the user may be prompted by the text "Essence watching mode". Further optionally, as shown in FIG. 3C, "Essence watching mode" in the downward of the progress bar of the currently playing page may be prompted to the user.

It should be noted that in the essence watching mode, the essence video may be played. Further, it is also possible to jump to play a target non-essence video according to the user's instruction. In the non-essence watching mode, a complete movie/teleplay may be played.

Figure 3D:
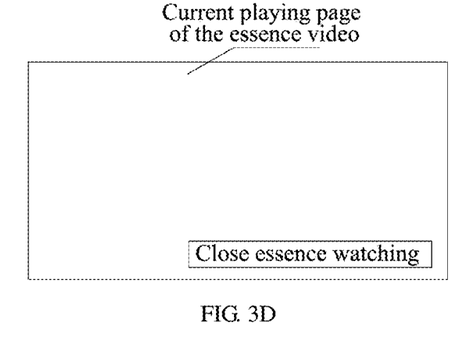

Further optionally, in order to facilitate the user to exit the essence watching mode, an entry to exit the essence watching mode may be provided in the current playing page of the essence video. For example, as shown in FIG. 3D, a button of "closing essence watching", and when the user selects the button, the essence watching mode may be exited. For another example, the user may exit the essence watching mode by inputting a voice of "closing essence watching".

Optionally, in order to facilitate the user to know the relationship between the essence video and the non-essence video of the movie/teleplay, the following Step 308 may also be performed after step 307.

Step 308, the terminal device marks a playing position of the essence video in the movie/teleplay and a playing position of a non-essence video in the movie/teleplay during a playing process according to an identifier of the essence video and an identifier of the non-essence video respectively.

In this step, the playing position may correspond to the playing time and may be used to indicate the playing time. Since there are chronological order between any two plot fragments of all the plot fragments of the movie/teleplay, the essence video and the non-essence video have corresponding playing positions in the movie/teleplay.

The identifier of the essence video may be used to indicate that the corresponding plot fragment is an essence video, the identifier of the non-essence video may be used to indicate that the corresponding plot fragment is a non-essence video. The playing position of the essence video in the movie/teleplay and the playing position of the non-essence video in the movie/teleplay may be determined according to the identifier of the essence video and the identifier of the non-essence video. Further, during the playing process, the playing position of the essence video in the movie/teleplay and the playing position of the non-essence video in the movie/teleplay may be marked.

Figure 3E:
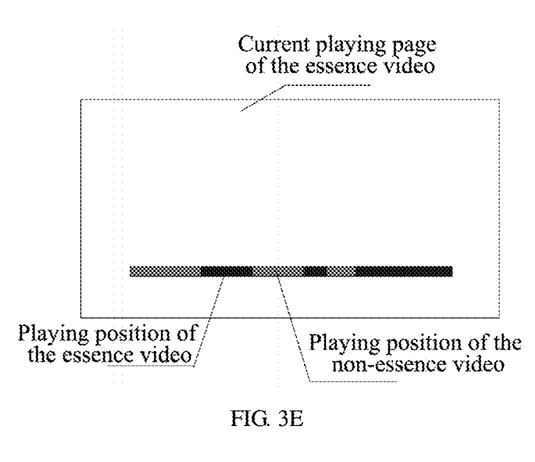

Optionally, the playing position may be indicated by the progress bar of the player, and the playing position is distinguished by that a color of the progress bar corresponding to the playing position of the essence video is different from a color of the progress bar corresponding to the playing position of the non-essence video. Further optionally, the portion of the progress bar for the playing position corresponding to the non-essence fragment may be gray, and the portion of the progress bar for the playing position corresponding to the essence fragment may be green, for example, as shown in FIG. 3E.

It should be noted that in order to realize the playing of the essence video, the terminal device may automatically skip the part of the non-essence video. In the process of playing the essence video, the user may need to view the non-essence video. Further optional, in order to improve the user experience, the following Steps 309-310 may also be included.

Step 309, the terminal device jumps to a target non-essence video according to the playing position of the target non-essence video in the movie/teleplay in response to a second playing indication from the user to the target non-essence video of the non-essence video.

In this step, the target non-essence video is part of the non-essence video, which may start from a specific one frame image of the non-essence video to the first frame image of the essence video and does not include the first frame image of the essence video. Specifically, the playing position of the target non-essence video in the movie/teleplay may be determined according to the second playing instruction, and then the target non-essence video is played by jumping to the playing position of the target non-essence video in the movie/teleplay.

Optionally, during the playing process of the essence video, the user may be provided with a playing function with frame skipping enabled, for example, the user may input a control instruction such as jumping to *minute*second, fast forwarding to the *-th minute, fast forwarding or fast backward for a certain length of time. Further, the playing position to be jumped to may be determined according to the current playing position and a control instruction. Here, the playing time to be jumped to may be the playing time of a target essence video, or the playing time of the target non-essence video. When the play time to be jumped to is the playing time of the target essence video, similarly, the target essence video may be jumped to according to a playing position of the target essence video in the movie/teleplay.

It is considered that the user selects to play the essence video, he/she would also be more inclined to watch the essence video. Therefore, further optionally, after Step 309, the following Step 310 may also be performed.

Step 310, the terminal device continuously plays the essence video adjacent to the target non-essence video after the playing of the target non-essence video ends.

In this step, the essence video adjacent to the target non-essence video may refer to a plot fragment of the essence video whose playing time is adjacent to the target non-essence video.

The method for generating the essence video provided by the present embodiment, by that the terminal device requests the essence video from the server in response to the first playing indication to the essence video of the movie/teleplay, that the server generates the essence video and sends the essence video to the terminal device, and the terminal device plays the essence video, achieves that the user may watch the essence video stitched naturally, developed logically and including a plot fragment with higher heat.

Figure 4:
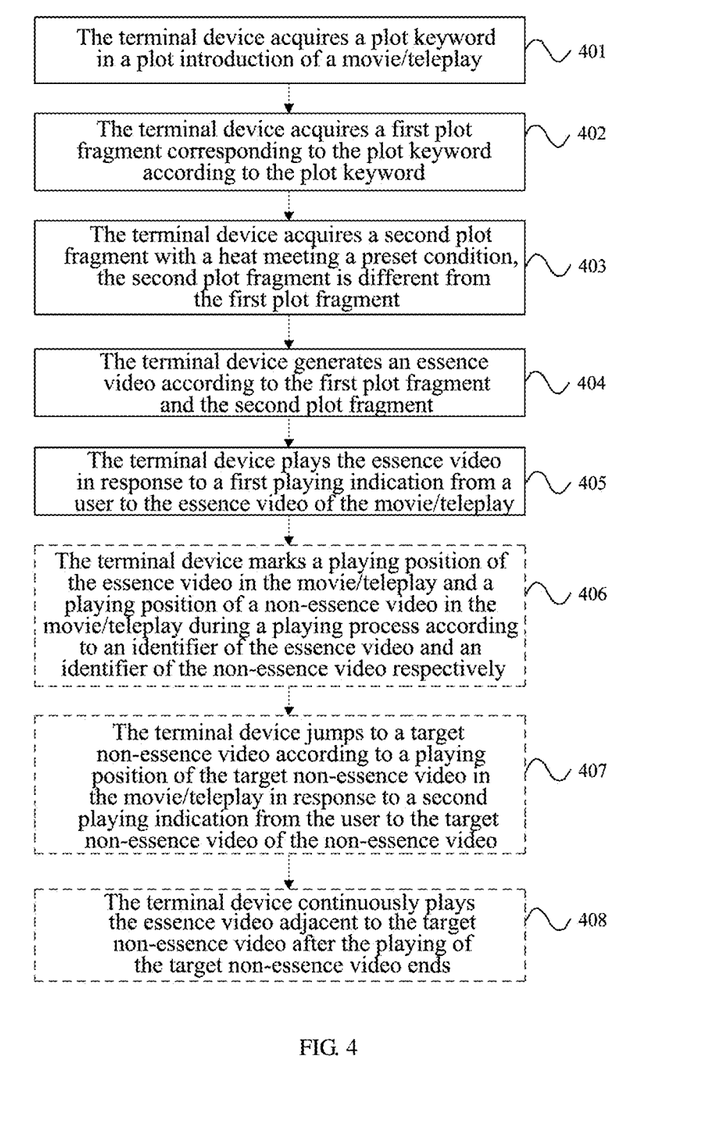
FIG. 4 is a schematic flowchart of a third embodiment of a method for generating an essence video according to an embodiment of the present disclosure.

FIG. 4 is a schematic flowchart of a third embodiment of a method for generating an essence video according to an embodiment of the present disclosure. on the basis of the embodiment shown in FIG. 2, the present embodiment mainly describes an optional implementation manner of generating an essence video by a terminal and playing the essence video by the terminal. As shown in FIG. 4, the method in the present embodiment may include:

Step 401, the terminal device acquires a plot keyword in a plot introduction of a movie/teleplay.

It should be noted that Step 401 is similar to Step 201, and details are not described herein again.

Step 402, the terminal device acquires a first plot fragment corresponding to the plot keyword according to the plot keyword.

It should be noted that Step 402 is similar to Step 202, and details are not described herein again.

Step 403, the terminal device acquires a second plot fragment with a heat meeting a preset condition, the second plot fragment is different from the first plot fragment.

It should be noted that the specific manner in which the terminal device acquires the second plot fragment in Step 403 is similar to the manner in which the server acquires the second plot fragment in Step 303, and details are not described herein again.

Step 404, the terminal device generates the essence video according to the first plot fragment and the second plot fragment.

It should be noted that, in Step 404, the manner in which the terminal device generates the essence video according to the first plot fragment and the second plot fragment is similar to the manner in which the server generates the essence video according to the first plot fragment and the second plot fragment in step 303, and details are not described herein again.

Step 405, the terminal device plays the essence video in response to a first playing indication from a user to the essence video of the movie/teleplay.

Optionally, similar to the embodiment shown in FIG. 3, after Step 405, the following Step 406 may be further included.

Step 406, the terminal device marks a playing position of the essence video in the movie/teleplay and a playing position of a non-essence video in the movie/teleplay during a playing process according to an identifier of the essence video and an identifier of the non-essence video respectively.

Further optionally, similar to the embodiment shown in FIG. 3, after Step 406, the following Steps 407-408 may be further included.

Step 407, the terminal device jumps to a target non-essence video according to a playing position of a target non-essence video in the movie/teleplay in response to a second playing indication from the user to the target non-essence video of the non-essence video.

Step 408, the terminal device continuously plays the essence video adjacent to the target non-essence video after the playing of the target non-essence video ends.

The present embodiment provides a method for generating the essence video, in which the terminal device generates an essence video, and paly the essence video in response to the first playing indication from the user to the essence video of the movie/teleplay, so that the user may watch the essence video stitched naturally, developed logically and including a plot fragment with higher heat.

Figure 5:
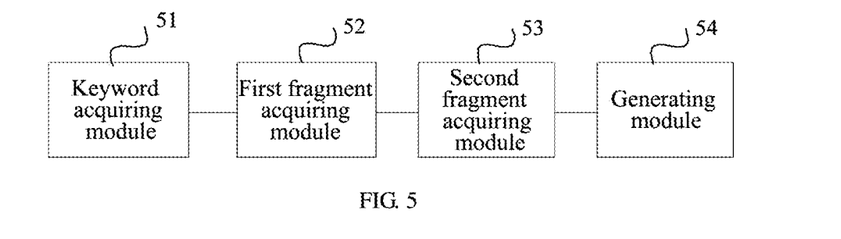
FIG. 5 is a schematic structural diagram of a first embodiment of an apparatus for generating an essence video according to an embodiment of the present disclosure.

FIG. 5 is a schematic structural diagram of a first embodiment of an apparatus for generating an essence video according to an embodiment of the present disclosure. The apparatus provided in the present embodiment may be applied to the foregoing method embodiments to implement the functions of the device for generating an essence video. As shown in FIG. 5, the apparatus of the present embodiment may include: a keyword acquiring module 51, a first fragment acquiring module 52, a second fragment acquiring module 53, and a generating module 54. Where, the keyword acquiring module 51 is configured to acquire a plot keyword in a plot introduction of a movie/teleplay;

the first fragment acquiring module 52 is configured to acquire a first plot fragment corresponding to the plot keyword according to the plot keyword;

the second fragment acquiring module 53 is configured to acquire a second plot fragment with a heat meeting a preset condition, the second plot fragment is different from the first plot fragment; and the generating module 54 is configured to generate the essence video according to the first plot fragment and the second plot fragment.

Optionally, the second fragment acquiring module 53 is specifically configured to:

determine an essence playing time according to a playing time of the movie/teleplay and a time factor of the movie/teleplay;

determine a heat playing time according to the essence playing time and a total playing time of all the first plot fragment; and acquire the second plot fragment with the heat meeting the preset condition in a plurality of third plot fragments according to the heat playing time, the plurality of third plot fragments are plot fragments belonging to the movie/teleplay.

Optionally, the second fragment acquiring module 53 is configured to acquire the second plot fragment with the heat meeting preset condition in the plurality of third plot fragments according to the heat playing time, specifically includes:

sorting the third plot fragments according to a heat, and obtaining the third plot fragments with the heat ranking from high to low; and screening the second plot fragment different from the first plot fragment in the third plot fragments in an order of heat from high to low until a total time of the second plot fragment reaches or exceeds the heat playing time.

Optionally, the second fragment acquiring module 53 is further configured to:

acquire the third plot fragments according to a barrage volume of the movie/teleplay; and determine a heat of each of the third plot fragments according to a barrage volume of each of the third plot fragments.

Optionally, the generating module 54 is specifically configured to generate the essence video according to an initial playing time of the first plot fragment in the movie/teleplay and an initial playing time of the second plot fragment in the movie/teleplay.

Figure 6:
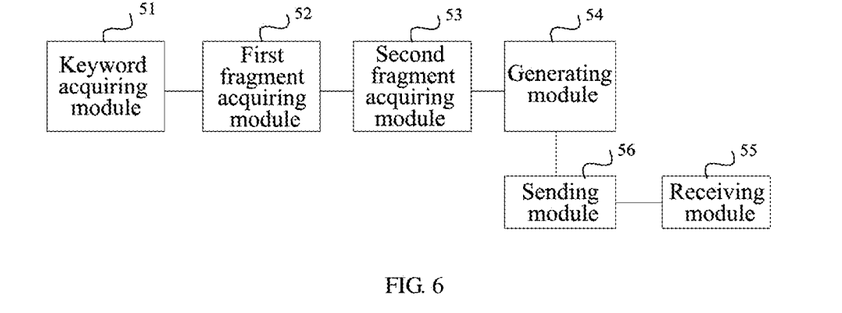
FIG. 6 is a schematic structural diagram of a second embodiment of an apparatus for generating an essence video according to an embodiment of the present disclosure.

FIG. 6 is a schematic structural diagram of a second embodiment of an apparatus for generating an essence video according to an embodiment of the present disclosure, on the basis of the embodiment shown in FIG. 5, the apparatus provided in the present embodiment optionally further includes: a receiving module 55 and a sending module 56.

Where, the receiving module 55 is configured to receive a playing request from a terminal device to the movie/teleplay, the playing request carries an identifier of the movie/teleplay; and the sending module 56 is configured to send a playing response to the terminal device, the playing response includes the essence video.

Figure 7:
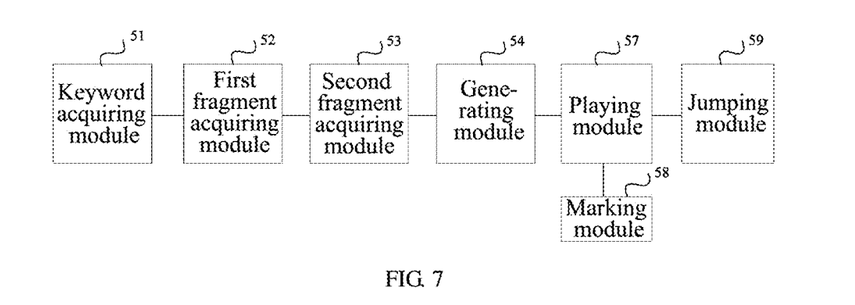
FIG. 7 is a schematic structural diagram of a third embodiment of an apparatus for generating an essence video according to an embodiment of the present disclosure.

FIG. 7 is a schematic structural diagram of a third embodiment of an apparatus for generating an essence video according to an embodiment of the present disclosure, on the basis of the embodiment shown in FIG. 5, the apparatus provided in the present embodiment optionally further includes: a playing module 57, configured to play the essence video in response to a first playing indication from a user to the essence video of the movie/teleplay.

Optionally, the apparatus of the present embodiment further includes: a marking module 58, configured to mark a playing position of the essence video in the movie/teleplay and a playing position of a non-essence video in the movie/teleplay during a playing process according to an identifier of the essence video and an identifier of the non-essence video respectively.

Optionally, the apparatus of the present embodiment further includes: a jumping module 59, configured to:

jump to a target non-essence video according to a playing position of the target non-essence video in the movie/teleplay in response to a second playing indication from the user to the target non-essence video of the non-essence video; and continuously play the essence video adjacent to the target non-essence video after the playing of the non-essence video ends.

The apparatus in the present embodiment may be used to implement the technical solution of the embodiments shown in the foregoing method, and the implementation principle and the technical effect are similar, and details are not described herein again.

Figure 8:
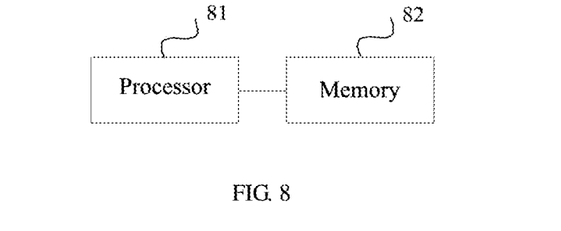
FIG. 8 is a schematic structural diagram of a device for generating an essence video according to an embodiment of the present disclosure.

FIG. 8 is a schematic structural diagram of a device for generating an essence video according to an embodiment of the present disclosure, as shown in FIG. 8, the device for generating an essence video may include: a processor 81 and a memory 82 configured to store computer instructions.

Where, the processor 81 runs the computer instructions to perform the following methods:

acquiring a plot keyword in a plot introduction of a movie/teleplay;

acquiring a first plot fragment corresponding to the plot keyword according to the plot keyword;

acquiring a second plot fragment with a heat meeting a preset condition, the second plot fragment is different from the first plot fragment; and generating the essence video according to the first plot fragment and the second plot fragment.

Optionally, the acquiring the second plot fragment with the heat meeting the preset condition includes:

determining an essence playing time according to a playing time of the movie/teleplay and a time factor of the movie/teleplay;

determining a heat playing time according to the essence playing time and a total playing time of all the first plot fragment; and acquiring the second plot fragment with the heat meeting the preset condition in a plurality of third plot fragments according to the heat playing time, the plurality of third plot fragments are plot fragments belonging to the movie/teleplay.

Optionally, the acquiring the second plot fragment with the heat meeting the preset condition in the plurality of third plot fragments according to the heat playing time includes:

sorting the third plot fragments according to a heat, and obtaining the third plot fragments with the heat ranking from high to low; and screening the second plot fragment different from the first plot fragment in the third plot fragments in an order of heat from high to low until a total time of the second plot fragment reaches or exceeds the heat playing time.

Optionally, before the acquiring the second plot fragment with the heat meeting the preset condition in the plurality of third plot fragments, it further includes:

acquiring a third plot fragments according to a barrage volume of the movie/teleplay; and determining a heat of each of the third plot fragments according to a barrage volume of each of the third plot fragments.

Optionally, the generating the essence video according to the first plot fragment and the second plot fragment includes:

generating the essence video according to an initial playing time of the first plot fragment in the movie/teleplay and an initial playing time of the second plot fragment in the movie/teleplay.

Optionally, the method further includes:

receiving a playing request from a terminal device to the movie/teleplay, the playing request carries an identifier of the movie/teleplay; and sending a playing response to the terminal device, the playing response includes the essence video.

Optionally, the method further includes:

playing the essence video in response to a first playing indication from a user to the essence video of the movie/teleplay.

Optionally, the method further includes:

marking a playing position of the essence video in the movie/teleplay and a playing position of a non-essence video in the movie/teleplay during a playing process according to an identifier of the essence video and an identifier of the non-essence video respectively.

Optionally, the method further includes:

jumping to a target non-essence video according to a playing position of the target non-essence video in the movie/teleplay in response to a second playing indication from the user to the target non-essence video of the non-essence video; and continuously playing the essence video adjacent to the target non-essence video after the playing of the target non-essence video ends.

The embodiment of the present disclosure further provides a storage medium, wherein when instructions in the storage medium is executed by a processor of an apparatus for generating an essence video, enabling the apparatus for generating the essence video to perform a method for generating an essence video, the method includes:

acquiring a plot keyword in a plot introduction of a movie/teleplay;

acquiring a first plot fragment corresponding to the plot keyword according to the plot keyword;

acquiring a second plot fragment with a heat meeting a preset condition, the second plot fragment is different from the first plot fragment; and generating the essence video according to the first plot fragment and the second plot fragment.

Optionally, the acquiring the second plot fragment with the heat meeting preset condition includes:

determining an essence playing time according to a playing time of the movie/teleplay and a time factor of the movie/teleplay;

determining a heat playing time according to the essence playing time and a total playing time of all the first plot fragment; and acquiring the second plot fragment with the heat meeting the preset condition in a plurality of third plot fragments according to the heat playing time, the plurality of third plot fragments are plot fragments belonging to the movie/teleplay.

Optionally, the acquiring the second plot fragment with the heat meeting the preset condition in the plurality of third plot fragments according to the heat playing time includes:

sorting the third plot fragments according to a heat, and obtaining the third plot fragments with the heat ranking from high to low; and screening the second plot fragment different from the first plot fragment in the third plot fragments in an order of heat from high to low until a total time of the second plot fragment reaches or exceeds the heat playing time.

Optionally, before the acquiring the second plot fragment with the heat meeting the preset condition in a plurality of third plot fragments, it further includes:

acquiring a third plot fragments according to a barrage volume of the movie/teleplay; and determining a heat of each of the third plot fragments according to a barrage volume of each of the third plot fragments.

Optionally, the generating the essence video according to the first plot fragment and the second plot fragment includes:

generating the essence video according to an initial playing time of the first plot fragment in the movie/teleplay and an initial playing time of the second plot fragment in the movie/teleplay.

Optionally, the method further includes:

receiving a playing request from a terminal device to the movie/teleplay, the playing request carries an identifier of the movie/teleplay; and sending a playing response to the terminal device, the playing response includes the essence video.

Optionally, the method further includes:

playing the essence video in response to a first playing indication from a user to the essence video of the movie/teleplay.

Optionally, the method further includes:

marking a playing position of the essence video in the movie/teleplay and a playing position of a non-essence video in the movie/teleplay during a playing process according to an identifier of the essence video and an identifier of the non-essence video respectively.

Optionally, the method further includes:

jumping to a target non-essence video according to a playing position of the target non-essence video in the movie/teleplay in response to a second playing indication from the user to the target non-essence video of the non-essence video; and continuously playing the essence video adjacent to the target non-essence video after the playing of the target non-essence video ends.

Those skill in the art will appreciate that all or part of the steps to implement the various method embodiments described above may be accomplished by hardware associated with program instructions. The aforementioned program instructions may be stored in a computer readable storage medium. The program instructions, when executed, performs the steps including the foregoing method embodiments; and the foregoing storage medium includes various media that can store program instructions, such as a read only memory (ROM), a random access memory (RAM), a magnetic disk, or an optical disk.

Finally, it should be noted that the above embodiments are only used to illustrate the technical solutions of the present disclosure, and are not limited thereto. Although the present disclosure has been described in detail with reference to the foregoing embodiments, it will be understood by those skilled in the art that the technical solutions described in the foregoing embodiments may be amended or equivalently substituted for some or all of the technical features; and such amendments or substitutions do not depart from the scope of the technical solutions of the embodiments of the present disclosure.

What is claimed is:

1. A method for generating an essence video, comprising:
   acquiring a plot keyword in a plot introduction of a movie/teleplay;

acquiring a first plot fragment corresponding to the plot keyword according to the plot keyword;

acquiring a second plot fragment with a heat meeting a preset condition, the second plot fragment being different from the first plot fragment, wherein the heat indicates a degree of interest of a user; and generating the essence video according to the first plot fragment and the second plot fragment by stitching the first plot fragment and the second plot fragment;

wherein the acquiring the second plot fragment with the heat meeting a preset condition comprises:

determining an essence playing time according to a playing time of the movie/teleplay and a time factor of the movie/teleplay;

determining a heat playing time according to the essence playing time and a total playing time of all the first plot fragment; and acquiring the second plot fragment with the heat meeting the preset condition in a plurality of third plot fragments according to the heat playing time, the plurality of the third plot fragments being plot fragments belonging to the movie/teleplay.

2. The method according to claim 1, wherein the acquiring the second plot fragment with the heat meeting preset condition in the plurality of the third plot fragments according to the heat playing time comprises:

sorting the third plot fragments according to a heat, and obtaining the third plot fragments with the heat ranking from high to low; and screening the second plot fragment different from the first plot fragment in the third plot fragments in an order of the heat from high to low until a total time of the second plot fragment reaches or exceeds the heat playing time.

3. The method according to claim 1, wherein before the acquiring the second plot fragment with the heat meeting the preset condition in a plurality of the third plot fragments, the method further comprises:

acquiring the third plot fragments according to a barrage volume of the movie/teleplay; and determining a heat of each of the third plot fragments according to a barrage volume of each of the third plot fragments.

4. The method according to claim 1, wherein the generating the essence video according to the first plot fragment and the second plot fragment comprises:

generating the essence video according to an initial playing time of the first plot fragment in the movie/teleplay and an initial playing time of the second plot fragment in the movie/teleplay.

5. The method according to claim 1, further comprising:

receiving a playing request from a terminal device to the movie/teleplay, the playing request carrying an identifier of the movie/teleplay; and sending a playing response to the terminal device, the playing response comprising the essence video.

6. The method according to claim 1, further comprising:

playing the essence video, in response to a first playing indication from a user to the essence video of the movie/teleplay.

7. The method according to claim 6, further comprising:

marking a playing position of the essence video in the movie/teleplay and a playing position of a non-essence video in the movie/teleplay during a playing process according to an identifier of the essence video and an identifier of the non-essence video respectively.

8. The method according to claim 7, further comprising:

jumping to a target non-essence video according to a playing position of the target non-essence video in the movie/teleplay in response to a second playing indication from the user to the target non-essence video of the non-essence video; and continuously playing an essence video adjacent to the target non-essence video after the playing of the target non-essence video ends.

9. A device for generating an essence video, comprising:

a processor and a memory configured to store computer instructions, wherein the processor runs the computer instructions to perform a method comprising:

acquiring a plot keyword in a plot introduction of a movie/teleplay;

acquiring a first plot fragment corresponding to the plot keyword according to the plot keyword;

acquiring a second plot fragment with a heat meeting a preset condition, the second plot fragment being different from the first plot fragment, wherein the heat indicates a degree of interest of a user; and generating the essence video according to the first plot fragment and the second plot fragment by stitching the first plot fragment and the second plot fragment;

wherein the processor runs the computer instructions to perform the method comprising:

determining an essence playing time according to a playing time of the movie/teleplay and a time factor of the movie/teleplay;

determining a heat playing time according to the essence playing time and a total playing time of all the first plot fragment; and acquiring the second plot fragment with the heat meeting the preset condition in a plurality of third plot fragments according to the heat playing time, the plurality of third plot fragments being plot fragments belonging to the movie/teleplay.

10. The device according to claim 9, wherein the processor runs the computer instructions to perform the method comprising:

sorting the third plot fragments according to a heat, and obtain the third plot fragments with the heat ranking from high to low; and screening the second plot fragment different from the first plot fragment in the third plot fragments in an order of heat from high to low until a total time of the second plot fragment reaches or exceeds the heat playing time.

11. The device according to claim 9, wherein the processor runs the computer instructions to perform the method comprising:

acquiring the third plot fragments according to a barrage volume of the movie/teleplay; and determining a heat of each of the third plot fragments according to a barrage volume of each of the third plot fragments.

12. The device according to claim 9, wherein the processor runs the computer instructions to perform the method comprising generating the essence video according to an initial playing time of the first plot fragment in the movie/teleplay and an initial playing time of the second plot fragment in the movie/teleplay.

13. The device according to claim 9, wherein the processor runs the computer instructions to perform the method further comprising:

receiving a playing request from a terminal device to the movie/teleplay, the playing request carrying an identifier of the movie/teleplay; and sending a playing response to the terminal device, the playing response comprising the essence video.

14. The device according to claim 9, wherein the processor runs the computer instructions to perform the method further comprising:

playing the essence video in response to a first playing indication from a user to the essence video of the movie/teleplay.

15. The device according to claim 14, wherein the processor runs the computer instructions to perform the method further comprising:

marking a playing position of the essence video in the movie/teleplay and a playing position of a non-essence video in the movie/teleplay during a playing process according to an identifier of the essence video and an identifier of the non-essence video respectively.

16. The device according to claim 15, wherein the processor runs the computer instructions to perform the method further comprising:

jumping to a target non-essence video according to the playing position of the target non-essence video in the movie/teleplay in response to a second playing indication from the user to the target non-essence video of the non-essence video; and continuously playing an essence video adjacent to the target non-essence video after the playing of the target non-essence video ends.

17. A non-transitory computer readable storage medium, wherein when instructions in the storage medium are executed by a processor of a device for generating an essence video, enabling the device for generating an essence video to perform the method according to claim 1.

\* \* \* \* \*